United States Patent
Girgaonkar

(10) Patent No.: US 8,161,395 B2
(45) Date of Patent: Apr. 17, 2012

(54) METHOD FOR SECURE DATA ENTRY IN AN APPLICATION

(75) Inventor: Sandeep Suresh Girgaonkar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 529 days.

(21) Appl. No.: 11/559,012

(22) Filed: Nov. 13, 2006

(65) Prior Publication Data

US 2008/0115078 A1 May 15, 2008

(51) Int. Cl.
*G06F 3/00* (2006.01)
*G06F 3/048* (2006.01)

(52) U.S. Cl. .................. 715/741; 715/773; 715/780

(58) Field of Classification Search .......... 715/771–773, 715/863–864
See application file for complete search history.

(56) References Cited

U.S. PATENT DOCUMENTS

| | | | | |
|---|---|---|---|---|
| 6,169,538 | B1 * | 1/2001 | Nowlan et al. | 715/773 |
| 6,359,572 | B1 * | 3/2002 | Vale | 341/23 |
| 7,098,896 | B2 * | 8/2006 | Kushler et al. | 715/863 |
| 7,406,666 | B2 * | 7/2008 | Davis et al. | 715/864 |
| 2004/0189706 | A1 | 9/2004 | Ieperen | |
| 2005/0210402 | A1 | 9/2005 | Gunn et al. | |
| 2006/0020815 | A1 * | 1/2006 | Varghese et al. | 713/182 |
| 2006/0028488 | A1 | 2/2006 | Gabay et al. | |
| 2006/0056626 | A1 * | 3/2006 | Keohane et al. | 726/16 |

FOREIGN PATENT DOCUMENTS

CN 1728062 A 2/2006

OTHER PUBLICATIONS

"International Application Serial No. PCT/US2007/084017, Search Report and Written Opinion mailed on Jun. 6, 2008", 8 pgs.
"Mouse Keyboard Wizard 2.1—Type With Your Mouse", [online]. [archived on Dec. 12, 2005]. Retrieved from the Internet: <URL: http://web.archive.org/web/20051212051753/http://www.vsisystems.com/mousekeyboard.htm>, 2 pgs.
"Chinese Application Serial No. 200710188231.X, Office Action Mailed on Mar. 20, 2009", 18 pgs.
Chinese Application No. 200710188231.X, Office Action Mailed Sep. 18, 2009, 9 pgs.

* cited by examiner

*Primary Examiner* — Tuyetlien Tran
*Assistant Examiner* — Truc Chuong
(74) *Attorney, Agent, or Firm* — Schwegman, Lundberg & Woessner, P.A.

(57) ABSTRACT

A method and device for entering data in an application is disclosed. The method may comprise displaying a graphical user interface (GUI) keyboard within the application, the keyboard comprising multiple identifier keys. A detection module may monitor the position of a pointer of a pointing device in relation to the multiple identifier keys and detects that the pointer of the pointing device has been positioned over one of the multiple identifier keys for a predetermined period of time, thereby detecting the selection of the identifier key. In response to detecting the selection, data associated with the selected identifier key may be generated and indication data representative of the generated data may be displayed in a data field.

25 Claims, 7 Drawing Sheets

METHOD FOR SECURE DATA ENTRY IN AN APPLICATION

FIELD

This application relates to a method and system for entering data in an application. In an example embodiment, the application relates to a method and a system for monitoring the positioning and movement of a pointer of a pointing device from within an application, and generating data in accordance with such movement.

BACKGROUND

To evade eavesdropping or spyware attacks in a network environment, applications typically make use of encryption between endpoints of the network, or other security protocols, such as HTTPs, when information is transmitted over the network, and in particular over the Internet. Apart from the security features embedded or used by applications, a process of educating users of computers has resulted in users being aware of the importance of keeping sensitive information safe.

Notwithstanding the security measures used by applications and the care taken by users to protect sensitive data, it is well known that information is inherently insecure between a user and an application used by the user. As applications typically do not protect the data when it is being entered in the application through user interfaces, the information may particularly be susceptible for interception and eavesdropping during this stage.

This security risk is exacerbated as the user would typically be under the impression that a secure application is being used and that the data is accordingly protected, while the application may guarantee that sensitive user data will be securely handled at all times.

Information being entered into an application through user interfaces is vulnerable due to the interaction between different computer components, described in more detail according to FIG. 1. Typically a user 10 enters data through an input device such as a keyboard 14. Every time the user presses a key, the keyboard 14 used notifies the operating system 16 of the computer of the key-press. In doing this, the keyboard 14 generates an interrupt signal which the CPU 16 captures and passes to an interrupt handler routine 18 and device driver 20 for handling, with the device driver 20 detecting what happened on the keyboard 14. Lastly, the operating system 16 sends the input device event to an active application 22, which will take the appropriate action, e.g. typing a letter forming part of a username or password.

As the device driver 20 does not form part of the operating system 16, but is installed separately to make the keyboard 14 work, the operating system 16 has a provision to associate a device driver 20 with the keyboard 14. Whenever any action or event is detected on the keyboard 14, the operating system 16 will assign the action or event to the device driver 20 to handle it.

It is this association between the operating system 16, the device driver 20 and the keyboard 14 that makes the process of entering data susceptible for capturing by malicious programs.

For example, a user's input is vulnerable to keystroke logging that captures a user's keystrokes, typically to obtain passwords or other sensitive data, thereby bypassing security measures of a system.

The operation of keystroke loggers may include logging everything typed by a user, logging the time when typed and the application where the data was entered. The data is typically logged into a protected file the user cannot see. Also, the keystroke loggers may log information that is stored on a clipboard e.g. copy-paste information and may further log mouse clicks and items selected on the GUI.

BRIEF DESCRIPTION OF DRAWINGS

The present application is illustrated by way of example and not limitation in the figures of the accompanying drawings, in which like references indicate similar elements and in which.

DETAILED DESCRIPTION

Figure 1:
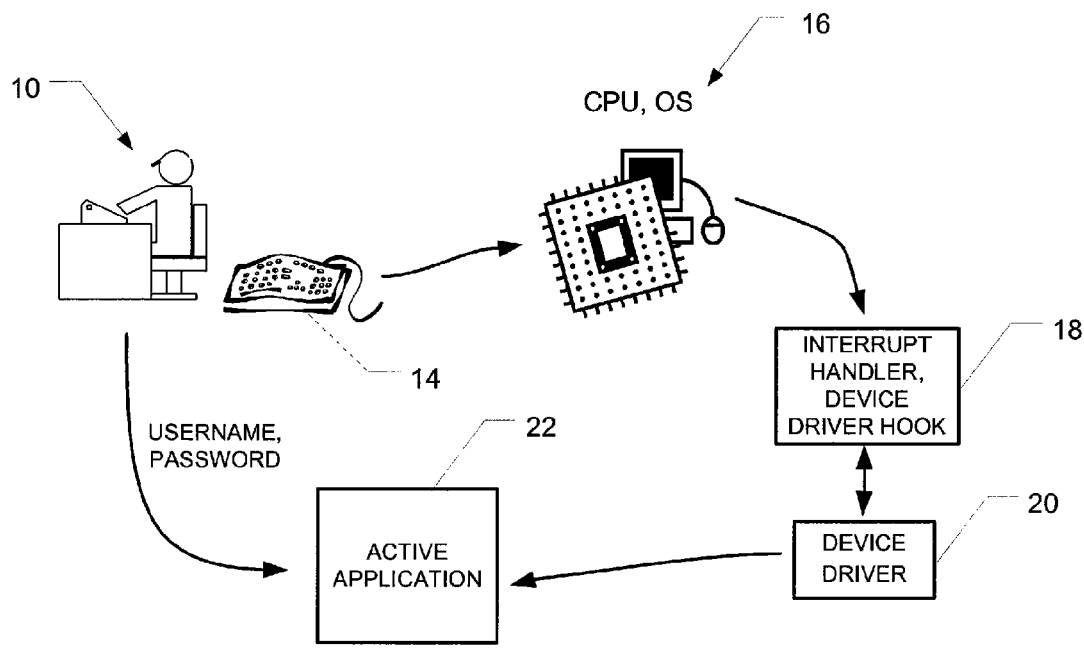
FIG. 1 shows an example of the prior art system where data entry is insecure.

In the following description, for purposes of explanation, numerous specific details are set forth in order to provide a thorough understanding of an embodiment of the present invention. It will be evident, however, to one skilled in the art that the present invention may be practiced without these specific details.

DETAILED DESCRIPTION OF THE DRAWINGS

The transferal of sensitive data from a user to an application program is inherently insecure. Thus, in an example embodiment, sensitive data that is entered by a user bypasses the conventional data flow that goes through OS components which, in many instances, is the cause of insecurity. In an example embodiment, motion of pointing device is used and, according, may avoid OS components or the like which may cause data insecurity. Thus, use of a hardware keyboard is avoided and hence no physical key presses are required. In order to avoid the use of a hardware keyboard, an example embodiment uses a GUI keyboard (soft-keyboard) and pointer motion/position to directly enter data into the application.

In an example embodiment, the soft-keyboard is integrated within the application and thus may not contribute to triggering a keystroke monitoring application. In an example embodiment, web-based e-mail application login screen may pops up the soft-keyboard (GUI keyboard) whenever required. In an example embodiment, the soft-keyboard may pop up when the user mouse clicks on a field to enter the secure data. Alternatively, in order to avoid this mouse click, each such field may be associated with a secure soft-keyboard icon where a soft-keyboard pops up by hovering mouse over the field. Hence, in this example embodiment, no mouse click is required to generate the soft-keyboard. It should be noted that, in an example embodiment, the soft-keyboard may pop up within the application rather than being available on the screen all the time.

In an example embodiment, the soft-keyboard is sized to occupy a small real estate. The soft-keyboard may be scalable and configured to shift between lowercase letters, capital letters, numbers and commonly used symbols. The soft-keyboard may have the option to display only required character types at any given time. In an example embodiment, the soft-keyboard may have a small text field which shows what is being typed on the soft-keyboard. This text field may display masked characters such as * or # or any other scrambled letters for entered data.

In an example embodiment, as described in more detail below, in order for the user to enter data (e.g., secure data), the user moves the mouse on or over particular soft-key such as a letter, a number or a symbol but need not click on the soft-key. A soft-keyboard application may track hovering of the mouse and accept the soft-key key as clicked or pressed if mouse hovers over it for predetermined amount of time (herein referred to as a soft-click). In an example embodiment, if mouse remains on the same soft-key for a long time after the soft-click has happened, no action may be taken.

The soft-keyboard may supports categories/groups for capital letters, small letters, numbers and others commonly used symbols or any other required keys by providing different tabs. In an example embodiment the soft-keyboard may have an option to display one or more character groups at any given time. In an example embodiment, hovering the mouse over a selected tab (e.g., for a few milliseconds) may be used to switch between these categories. The soft-keyboard may be customized for various different applications. For example, in the case of Credit Card number entry, only numeric keys are sufficient. The soft-keyboard can be configured to hide unwanted key categories. To accept a new entered/identified value, the user may soft-click an 'Enter' or 'Done' button on the soft-keyboard. In an example embodiment, since this keyboard is part of the application and is associated with only one particular field on the screen, the soft-keyboard writes the value into the field on the screen.

The present application relates to a system, device and method for entering data in an application, by providing a graphical user interface (GUI) keyboard, e.g. an on-screen keyboard, in the application's GUI, for monitoring the positioning and movement of a pointer of a pointing device in relation to the keyboard. Thereafter, data is generated responsive to such detected positioning and movement.

The system, device and method may provide added security measures when sensitive information is to be captured by an application. In general the device may be incorporated in any application where a user needs to enter sensitive information. For example, the method may be implemented in any web-based applications, such as e-commerce applications, online banking applications and standalone applications, such as personal finance software applications. These applications typically capture sensitive information such as usernames, passwords, social security numbers, personal information (e.g. date of birth, address and phone numbers), banking details (e.g. credit card numbers) and other similar information.

In an example embodiment, the method, device and system provides a GUI keyboard and keypad that has a random key layout and where the keyboard may be embedded in an application that prompts a user for a password. In an example embodiment, as the GUI keyboard is generated from within the application, and no pointer device interrupts (e.g., processor interrupts for mouse clicks) or keyboard interrupts are required, capturing of the user input may be accomplished in a more secure manner.

Figure 2:
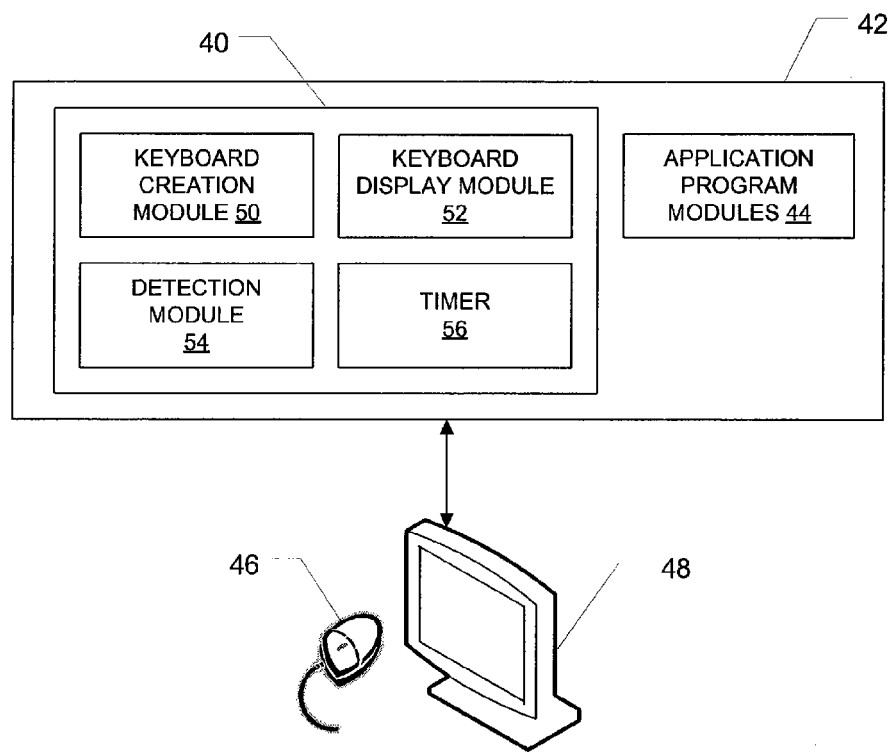
FIG. 2 shows functional modules of an application in accordance with an example embodiment.

FIG. 2 shows an example embodiment of a device 40 for entering data in an application 42 comprising various application modules 44. The data may be entered by using any type of pointing device 46, such as a mouse, within a graphical user interface (GUI) on a display 48. Other pointing devices may include a trackball, touchpad, pointing stick, lightpen, head pointer, data glove or various kinds of digitized tablets which may use a stylus. It should thus be noted that any input device that allows a user to identify a position/location within the GUI may be used.

The GUI may be any type of GUI interface for any type of application 42 where information or data is to be captured. A GUI may, for example, include graphical images such as icons and windows, widgets, data fields and text.

The display 48 may also be any type of display, for example a CRT (cathode ray tube) or LCD (liquid crystal display) used for the screen of a personal computer, such as a desktop or laptop, or the screen of a Personal Digital Assistant (PDA).

The data entry device 40 is shown to include a keyboard creation module 50, a keyboard display module 52, a detection module 54 and, optionally, a timer 56.

The keyboard creation module 50 creates (or generates) one or more GUI keyboards or on-screen keyboards for the data entry device 40. Different GUI keyboards (optionally having different layouts) which may include keypads, for display on the display 48 may be created every time the device 40 detects an activation of a keyboard. Examples of different GUI keyboards generated by the keyboard creation module 50 and displayed by the keyboard display module 52 are shown in FIGS. 3, 4A to D and 5.

An example GUI keyboard 60 comprising multiple identifier keys is shown in FIGS. 3, 4A to 4D and 5. In FIGS. 3, 4A to 4D and 5 the same reference numerals have been used for similar identifier keys. In the example GUI keyboard 60, a user may select uppercase letter, lowercase letters, numerals and symbols by selecting an associated tab. Thus, in an example embodiment, the multiple identifier keys may include alphabetic identifier keys, in particular capitalized alphabetic identifier keys 80A shown in FIG. 4A and lower case alphabetic identifier keys 80B shown in FIG. 4B, numeric identifier keys 82 shown in FIG. 4C and symbol identifier keys 84 shown in FIG. 4D to enter data. The multiple identifier keys may further include action keys, such as an unmask identifier or "Show" key 86 (which when activated allows the GUI to display keys as they are selected), a finalization identifier or "Done" key 88, a correction identifier or "Backspace" key 90, or any other keys. The keyboard may also include a keyboard data field 92 which displays indication data representative of data generated by the data entry device 40.

The unmask or "Show" identifier 86, when selected, may change the indication data displayed in the keyboard data field 92 (or in the GUI's data field) from masked data to generated data. Masked data would typically comprise an asterisk, hash, ampersand symbols or other similar symbols (including a randomly generated sequence) for each individual piece of generated data (keyboard entry). It will be appreciated that masking key entries (or any data entered via the GUI keyboard) data may be used in order to ensure that screen shots cannot capture the entered data in the data fields. Generated data would be the data as selected by the user using the GUI keyboard, e.g., alphabetic, numeric or symbol data.

When the finalization identifier or "Done" key 88 is selected, the data entry device 40 may move the indication data displayed in the keyboard data field 92 to the associated data field in the application's GUI. It should be noted that the application can also capture the data (or key entries) on-the-fly.

The correction identifier or "Backspace" key 90 may function as a "delete" or "back-space" button and may be used to correct or remove an incorrect entry into a data field by deleting specified data in the data field.

Figure 3:
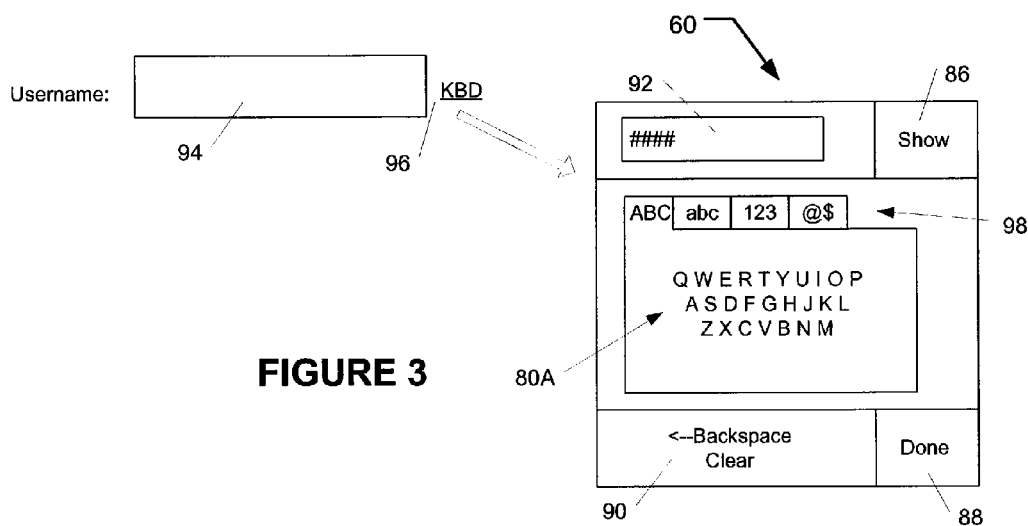
FIG. 3 shows an example of an application's graphical user interface (GUI) on a display showing the data to be input and the presentation of the GUI keyboard in accordance with an example embodiment.
Figure 5:
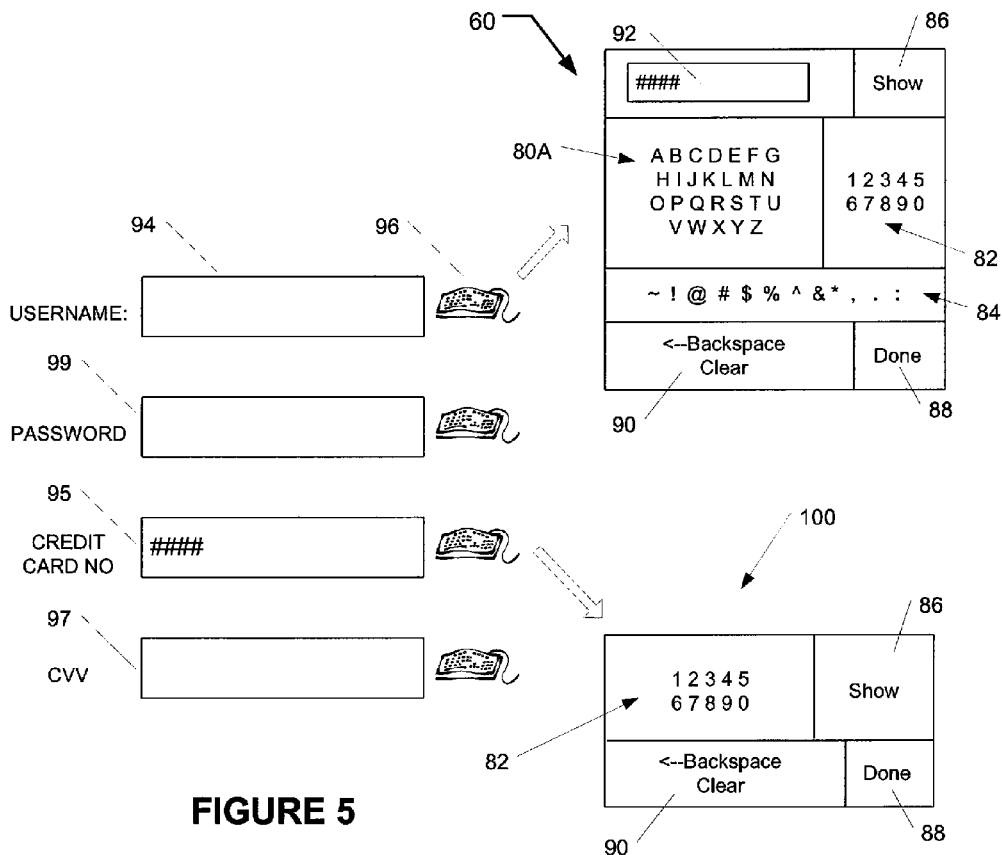
FIG. 5 shows a further example of an application's GUI with two GUI keyboards in accordance with an example embodiment.

The GUI keyboard(s) created by the keyboard creation module 50 are typically small enough to pop-up next to a data field 94, shown in FIGS. 3 and 5, in which information is to be entered by a user. FIGS. 3 and 5 also show keyboard identifiers 96 displayed next to the data field 94. Both the keyboard identifiers and the data fields may be used as data field selectors by the users. The keyboard identifiers 94 may be a keyboard icon, the word "keyboard" or an abbreviation and allow a user to select a data field in which data has to be entered and further allow for the activation of a GUI keyboard 60 associated with the data field selector 96.

As shown in FIGS. 3 and 4A to 4D, the keyboard 60 may have tabs 98 to allow a user to shift between different identification key screens, in particular, screens for the uppercase or capital alphabetic identifier keys 80A, the lowercase alphabetic identifier keys 80B, the numerical identifier keys 82 and the symbol identifier keys 84.

Alternatively, the keyboard creation module 50 may configure and create different GUI keyboards depending on the type of data to be entered by a user in a data field. For example, a combination or selection of the identifier keys may form a single GUI keyboard display 100, as shown by way of example in FIG. 5. In the example embodiment, the GUI keyboard 100 is shown to be associated with a credit card number field 95 and CVV field 97, may comprise only numerical identifier keys, as that would be the keys required to fill in the field. Identifier keys for commonly used symbols (such as ".", "," etc) may also be added to every keyboard display. In an example embodiment, numeral identifiers, alphabetic identifiers, and/or symbols may be associated with a password field 99.

Figures 4A, 4B:
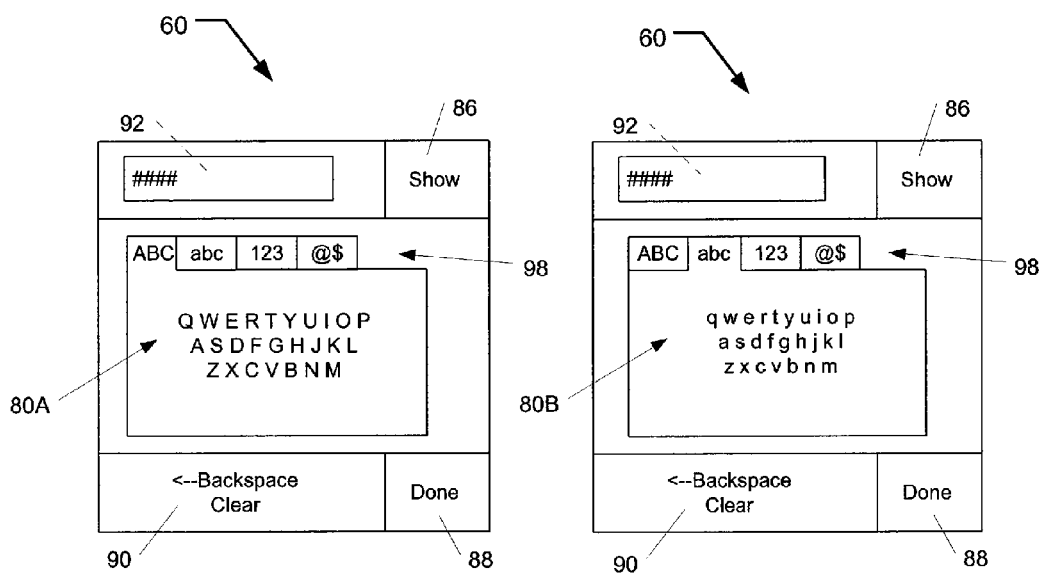
FIGS. 4A to 4D shows an example of the different identifier key screens of the GUI keyboard shown in FIG. 3, in accordance with an example embodiment.
Figure 4C:
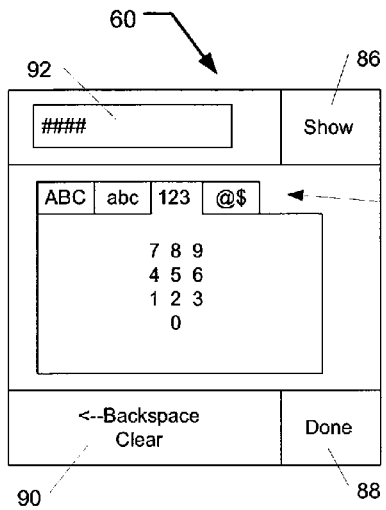
Figure 4D:
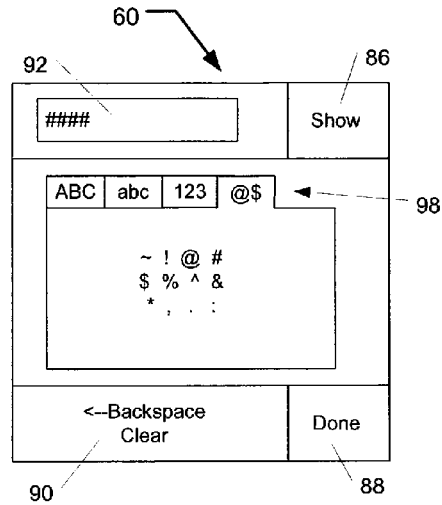

The keyboard creation module 50 may further be responsible for creating variations (e.g., small variations) in the keyboard layout, amongst other things changing between a consecutive alphabet (e.g. "ABCDE"), shown in FIG. 5, to a QWERTY layout (shown in FIGS. 3, 4A and 4B). Likewise, in an example embodiment, the keyboard creation module 50 may further be responsible for creating variations (e.g., small variations) in the layout of the alphabetic identifiers, numeral identifiers, and/or symbols. Examples of small variations may include changes in sequence of the characters/symbols (e.g., QWERTY to ABCDE etc.), changes in an image associated with the character, changes in the overall position and size of pop-up soft-keyboard, changes in the position of tabs, firing false events, or the like.

The keyboard creation module 50 may use images for each of the multiple identifier keys and may change these images each time a GUI keyboard is generated and displayed. It will be appreciated that images would be more difficult to analyze by eavesdroppers. The keyboard creation module 50 may further provide small variations in the positioning and sizes of the multiple identifier keys each time a keyboard is generated.

The keyboard creation module 50 may also create false events, for example, in combination with the timer 56, false timer events may be created or false pointer movements may be simulated.

The keyboard creation module 50 may further map the multiple identifier keys to a random code. This technique may be useful in Javascript implementations, since Javascript source can be read through a browser. For example, in a Javascript implementation, the following code maps an identifier key to the mouse event handler may be provided.

<a href="A" onMouseOver="javascript:omoHandler('A');" onMouseOut="javascript:omoutHandler( );">A</a>

Instead of this direct mapping, in an example embodiment a randomly generated code can be used to identify the identifier key for 'A' in a mouse event handler. For example:

<AHREF="2086"onMouseover="javascript:omoHandler('2086');"omMouseOut="javascript:omout Handler( );"> <IMG SRC="38592.gif"></A>

The mapping between an identifier key and its code can be generated randomly each-time. If there are malicious programs attempting to analyze the code, this technique may impede the mapping images on screen to the information being typed-in.

The keyboard display module 52 displays the GUI keyboard within the application's GUI on the display 48 whenever a user selects a data field selector, for example by positioning the pointer of the pointing device 46 over a GUI data field 94, clicking the pointing device in this position, or by positioning the pointer of the pointing device 46 for a predetermined amount of time over any of the keyboard identifiers 96.

The keyboard display module 52 may further generate data associated with an identifier key selected by the user and display indication data representative of the generated data in a data field. As mentioned above, the indication data may either be masked data (e.g. hash symbols) or the generated data (e.g. the specific data entered via the GUI keyboard). In an example where generated data is displayed, the keys selected or "entered" by the user (e.g., letters, numerals, and/or symbols) may be displayed as entered by the user.

The data field in which the indication data is displayed by the keyboard display module 52 may be the keyboard data field 92. However, it will be appreciated that indication data may be displayed directly in the GUI data field, as shown in FIG. 5 by the credit card number data field 95 and its associated GUI keyboard 100.

In cases where the indication data is displayed in the keyboard data field 92 and the user selects the finalization identifier or "Done" key 88 on the GUI keyboard 60, 100, the keyboard display module 52 may also display the indication data representative of the generated data in the associated GUI data field 94 (see FIGS. 3 and 5). The keyboard display module 52 may also, on the selection of the finalization identifier key 88, remove the display of the GUI keyboard from the application's GUI (e.g., close a pop-up displaying the GUI keyboard 60, 100) and, accordingly, from the display 48. Once another data field 94 or keyboard identifier 96 is selected, another GUI keyboard may be displayed by the keyboard display module 52.

The detection module 54 may be responsible for detecting any selection of a data field selector 96 or a selection of one of the multiple identifier keys. Apart from where a user selects a GUI data field 94 by clicking the pointer of the pointing device 46 in the data field 94, the detection module 54 may also detect a selection of a user by monitoring the movements and positioning of the pointer of a mouse over the data field selector 96 or any of the multiple identifier keys. Thus, the GUI keyboard 60, 100 may be generated by an application by monitoring pointer position and need not be initiated using any pointer clicks (e.g., mouse clicks).

When the detection module 54 detects the selection of an identifier key by the user, it will generate data associated with the selected identifier key and instruct the keyboard creation module 50 to create a GUI keyboard and may further instruct the keyboard display module 52 to display indication data representative of the generated data in a data field. Alternatively, when an action identifier key is selected, the detection module may instruct other modules to take an associated action.

In an example embodiment, the detection module 54 may monitor the position of the pointer of the pointing device in relation to the multiple identifier keys and detect when the pointer of the pointing device has been positioned over one of the multiple identifier keys for a predetermined period of time, thereby selecting the identifier key. For example, once the pointer of a mouse has been positioned over the identifier key for "A" for the predetermined period of time (e.g., a second or two), the detection module detects "A" as being selected by the user.

When the detection module 54, through its monitoring process, detects that the position of the pointer in relation to a data field selector in the application's GUI has been positioned over the data field selector for a predetermined period of time, the detection module may register a request for the display of a GUI keyboard associated with the data field selector. As mentioned above, the data field selector may be a data field in the GUI or may be any keyboard identifier 96 located next to a data field. It should be noted that the request to display the GUI is processed internally within the application receiving the request (e.g., a financial program).

The detection module 54 may further detect that the pointer of the pointing device has been positioned over the unmask identifier key for a predetermined period of time. Once this has been detected, the detection module 54 may detect the type of indication data, e.g. whether the indication data is masked data or generated data. In the event that it is masked data, the data entry device 40, and in particular the keyboard display module 52, may change the indication data to the generated data. Similarly, in the event that the indication data is generated data, the data entry device will change the display of the indication data to masked data.

When the detection module 54, through its monitoring process, detects that the pointer of the pointing device is positioned over the finalization identifier or "Done" key 88 for a predetermined period of time, the data entry module may be instructed to remove the display of the GUI keyboard from the application's GUI of the application (e.g., close a pop-up window displaying the GUI keyboard 60, 100); and the keyboard display module 52 may display data representative of the generated data in the GUI data field.

The detection module 54 may have further functionality to only register one selection of an identifier key, if the pointer of the pointing device remains in a fixed position over an identifier key for a period longer than the predetermined period of time. This is to provide the user with additional time to select the next identifier key.

The timer 56 may provide the detection module 54 with the predetermined period of time for detecting any selection of one of the multiple identifier keys or the data field selector. For example, the timer may be started when the pointer of the pointing device is detected over an identifier key and if the pointer is still over the identifier key at the timer's time-out, a key selection will be registered. It will be appreciated that the timer 56 may form part of the computer system implementing the application and data entry device. However for an outside program, the probability of finding an association between timer events and keys selected would be low.

It will be appreciated that the sensitivity of the GUI keyboard and the predetermined time period necessary for any of the identifier keys to be selected may have to be adjustable by users of the GUI keyboard. The keyboard creation module 50 may provide functionality to configure the GUI keyboard to suit a user. For example, the user may specify a time period for selection during the first use of the GUI keyboard. In an example embodiment, a pointer device "park" area may be provided. In this example embodiment, a timer may not be required but the user may then identify or select a key as follows. The user may position a pointer over a selected key and then move the pointer to the "park" area to indicate a selection. Thus instead of retaining the pointer over a selected key for a predetermined time period, the user identifies his or her selection by moving the pointer to the "park" area. Thus, the "park" area may define a selection zone or identifier whereby the user can indicate selection of a key identified by the previous location or position of the pointer. In an example embodiment, letters, numerals and/or symbols may be arranged around the "park" area thereby to facilitate selection by the user.

Figure 6:
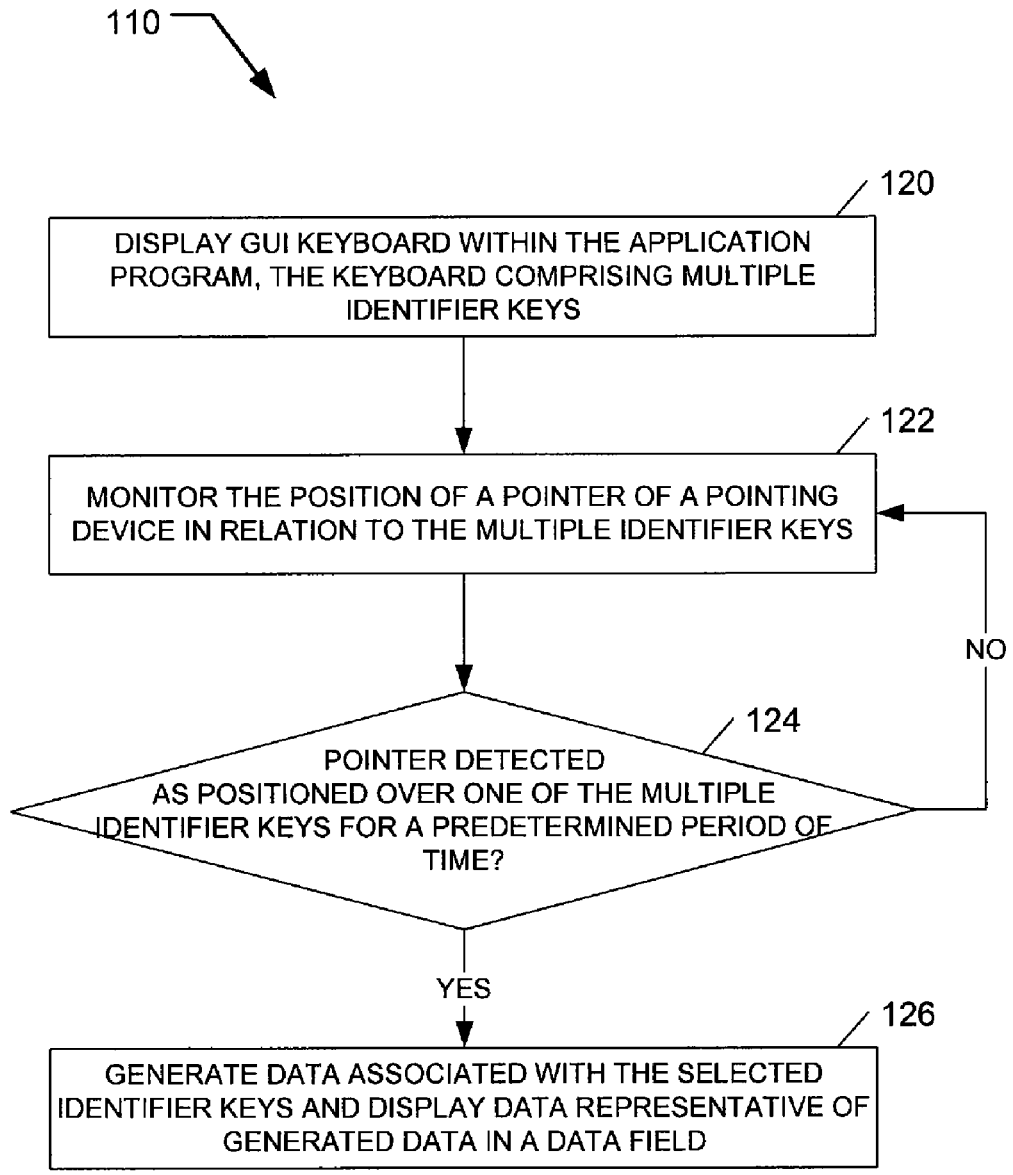
FIG. 6 is a simplified flow diagram illustrating a method for secure data entry in accordance with an example embodiment.

FIG. 6 shows a simplified flow diagram of an example embodiment of the method 110 of secure data entry in accordance with an example embodiment. Starting at operation 120, the method 110 comprises displaying a GUI keyboard within an application, with the GUI keyboard, as for example described above, comprising multiple identifier keys.

In operation 122 and 124 the detection module 54 monitors the position of a pointer of a pointing device (e.g., a mouse) in relation to the multiple identifier keys (e.g., letters and/or numerals) of the GUI keyboard and also detects whether the pointer has been positioned over any of the identifier keys for a predetermined period of time, which constitutes the selection of the identifier key. In an example embodiment where the "park" functionality described above is used, instead of detecting a time period for which the pointer is retained over a selected identifier key, the method 110 may include detecting when the pointer is mover to the park area.

The keyboard display module 52 may generate, in response to the above user selection, data associated with the selected identifier key and display data representative of the generated data in a data field. As mentioned above, the data field may be either a data field 94 of the application's GUI or may be a data field 92 of the GUI keyboard.

Figure 7:
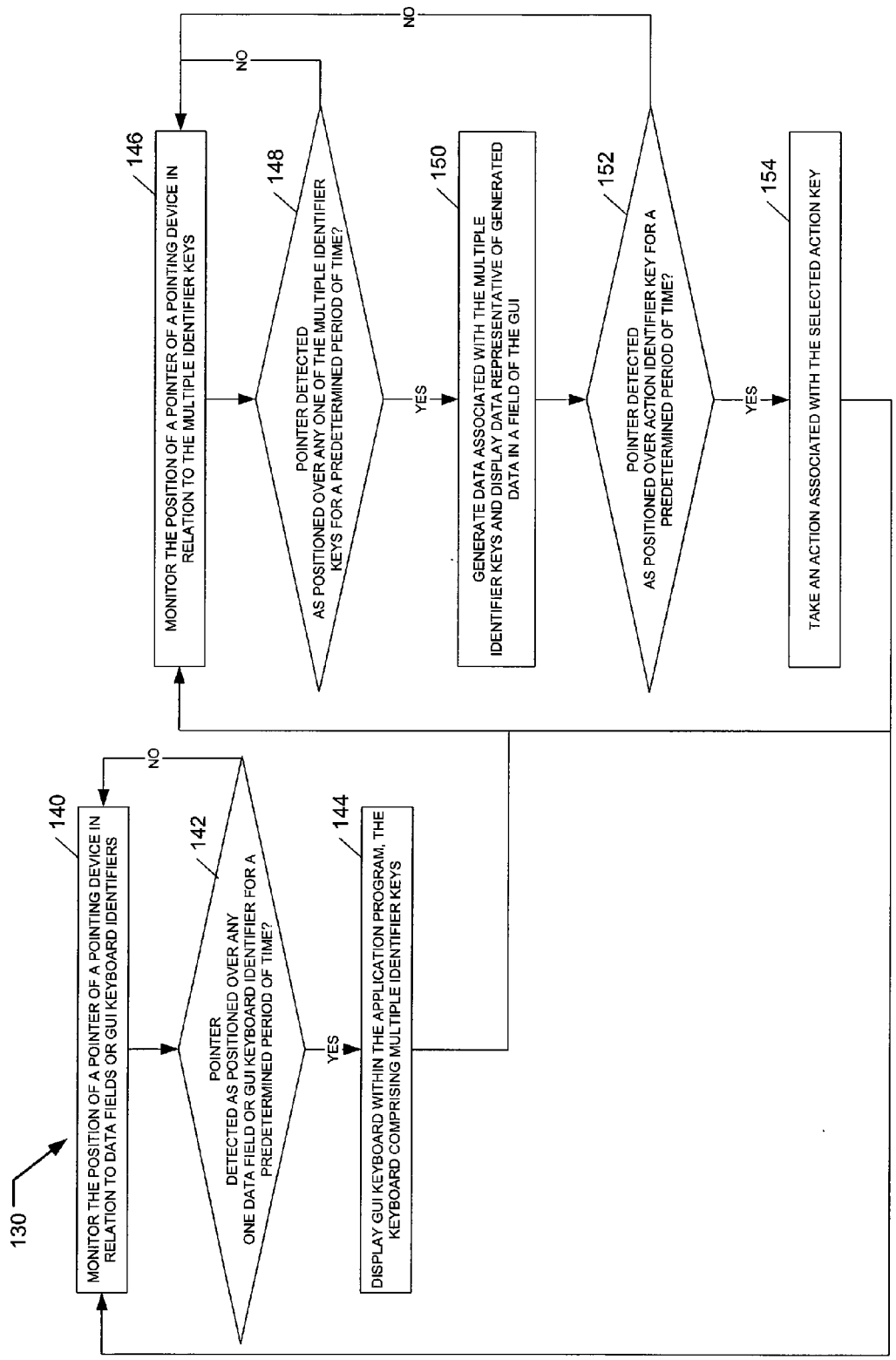
FIG. 7 shows a detailed flow diagram illustrating a method for secure data entry in accordance with an example embodiment.
Figure 8:
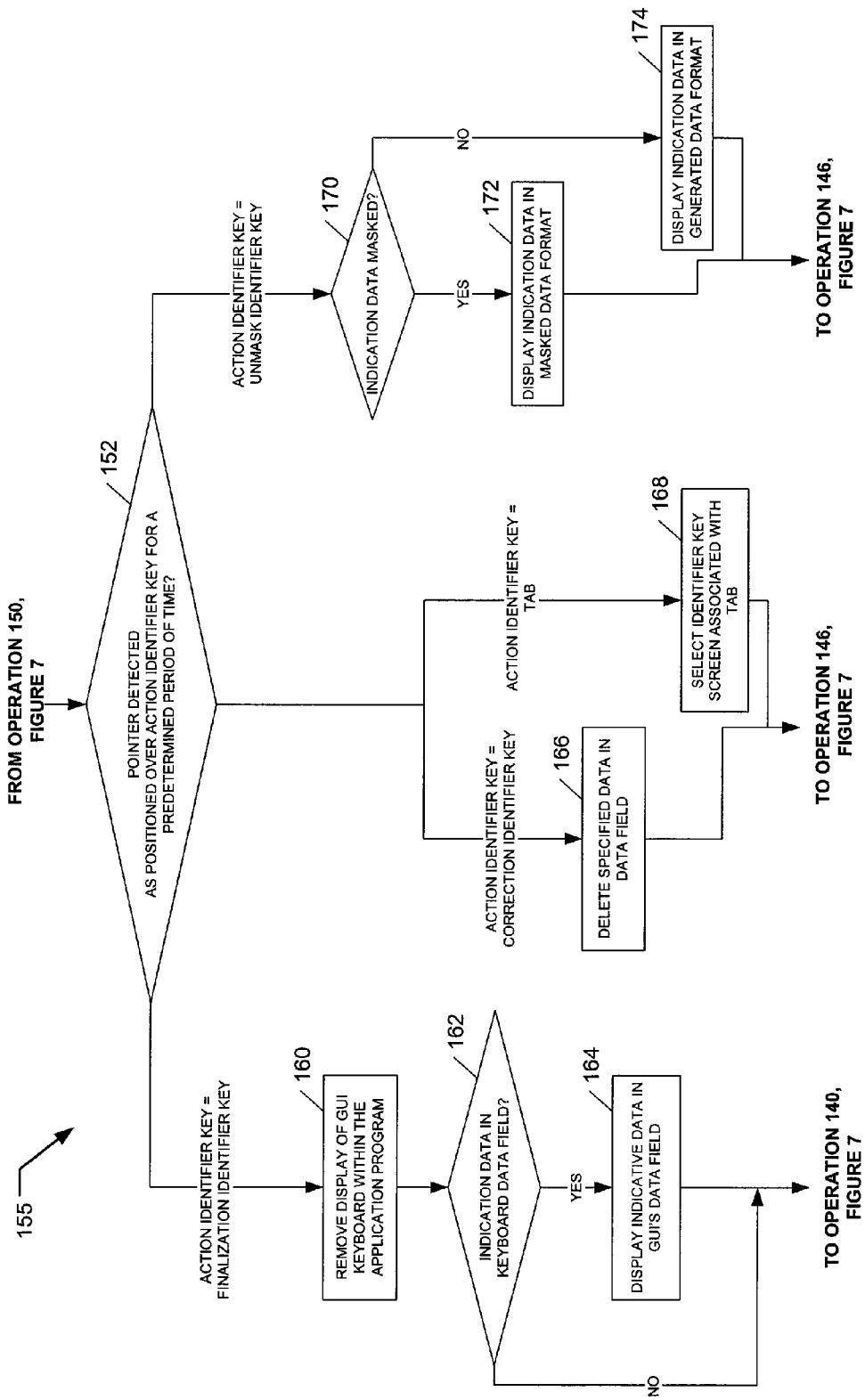
FIG. 8 shows a portion of the flow diagram of FIG. 7 illustrating a portion of the method in more detail.

FIG. 7 shows a method 130, in accordance with an example embodiment, for secure data entry. The method 130 may correspond to the method 110 illustrated by FIG. 6 but is shown to include more optional detail. FIG. 8 shows a method 155 which may be incorporated into the method 130. In operation 140, the detection module 54 of the data entry device 40 monitors the position of the pointer of the pointing device 46 in relation to a data field selector in a GUI of the application. As has been discussed above, the data field selector may be a keyboard identifier 96 associated with a data field in the application's GUI or a data field 94 in the application's GUI. Thus, in an example embodiment, the GUI keyboard can be selected by a user without any mouse clicks.

The detection module 54 may detect, in operation 142, that the pointer of the pointing device 46 has been positioned over the data field selector for a predetermined period of time, and detect this as a request to display a GUI keyboard associated with the data field selector. In an example embodiment, a user may also select a data field by clicking the user's pointing device 46 on the data field 94.

Once the data field selector has been selected, the keyboard creation module 50 may create an appropriate GUI keyboard, which the keyboard display module 52 may then display within the application GUI (shown in operation 144).

Similar to operations 122 and 124 of FIG. 6, and shown in operations 146 and 148 in FIG. 7, the detection module 52 may monitor the position of the pointer of the pointing device 46 in relation to the multiple identifier keys of the GUI keyboard and detect whether any of the multiple identifier keys have been selected by the pointer being positioned over any of the keys for a predetermined period of time.

As shown in operation 150, the keyboard display module 52 may generate, in response to this selection, data associated with the selected identifier key and display data representative of the generated data (e.g., display the data in a data field 94 or 92). Again, the data field may be either a data field of the application's GUI 94 or may be a data field of the GUI keyboard 92.

As the multiple identifier keys may further include action keys, the detection module 54 may further monitor and detect that the pointer of the pointing device 46 has been positioned over one of the action keys for a predetermined period of time, to thereby select the action key (operation 152) and then request the data entry device 40 to take the relevant action associated with the selected action key (operation 154).

Example detail of operations 152 and 154 are shown in more detail in FIG. 8, with this Figure starting at operation 152 of FIG. 7, where the keyboard display module 52 detects that an action identifier key has been selected.

If the selected action key is the finalization identifier or "Done" key 88, the keyboard display module 52 may removes the display of the GUI keyboard from the application's GUI in operation 160. This may indicate that the data captured for the specific field has been completed. The detection module 54 may now, in operation 162, detect whether the indication data has been displayed in the GUI keyboard's data field 92. If this is indeed the case, the keyboard display module 52 may display data representative of the generated data in the application's data field 94 (operation 164). Once this has been completed, the detection module 54 of the data entry device may return to operation 140 (FIG. 7) to monitor the possible selection of a data field selector.

In the event that the selected action identifier key is the correction identifier key 90, the keyboard display module 52 may delete indication data displayed in the data field in operation 166.

Operation 168 shows the action where the action identifier key is a tab identifier key 98. In response to the selection the keyboard creation module 50 selects the identifier key screen associated with the tab identifier key 98.

Lastly, where the action identifier key selected is an unmask identifier key 86, the actions according to operations 170 to 174 are taken. The detection module 54 may detect the type of indication data displayed in the data field in operation 170. If the displayed indication data is masked data, the keyboard display module 52 may display the indication data as generated data in the data field (operation 172). Alternatively, if the detection module 54 detects that the displayed indication data in the data field is generated data, the display module, in operation 174, displays the indication data as masked data.

As the data entry device 40 may form part of the application 42, example embodiments of the present application may avoid or (at least reduce) the use of the input device 46, in particular keystrokes or mouse clicks generated by the input device 46 when entering data into the application 42. It will therefore be appreciated that the data entry device 40 may bypass the OS layers/components of a computing device that increase the risks of keystroke logging or other similar malicious programs.

The present system, device and method provide further security features as the generated data in response to selected keys may be masked, and may be displayed as generated data at the choice of the user.

Figure 9:
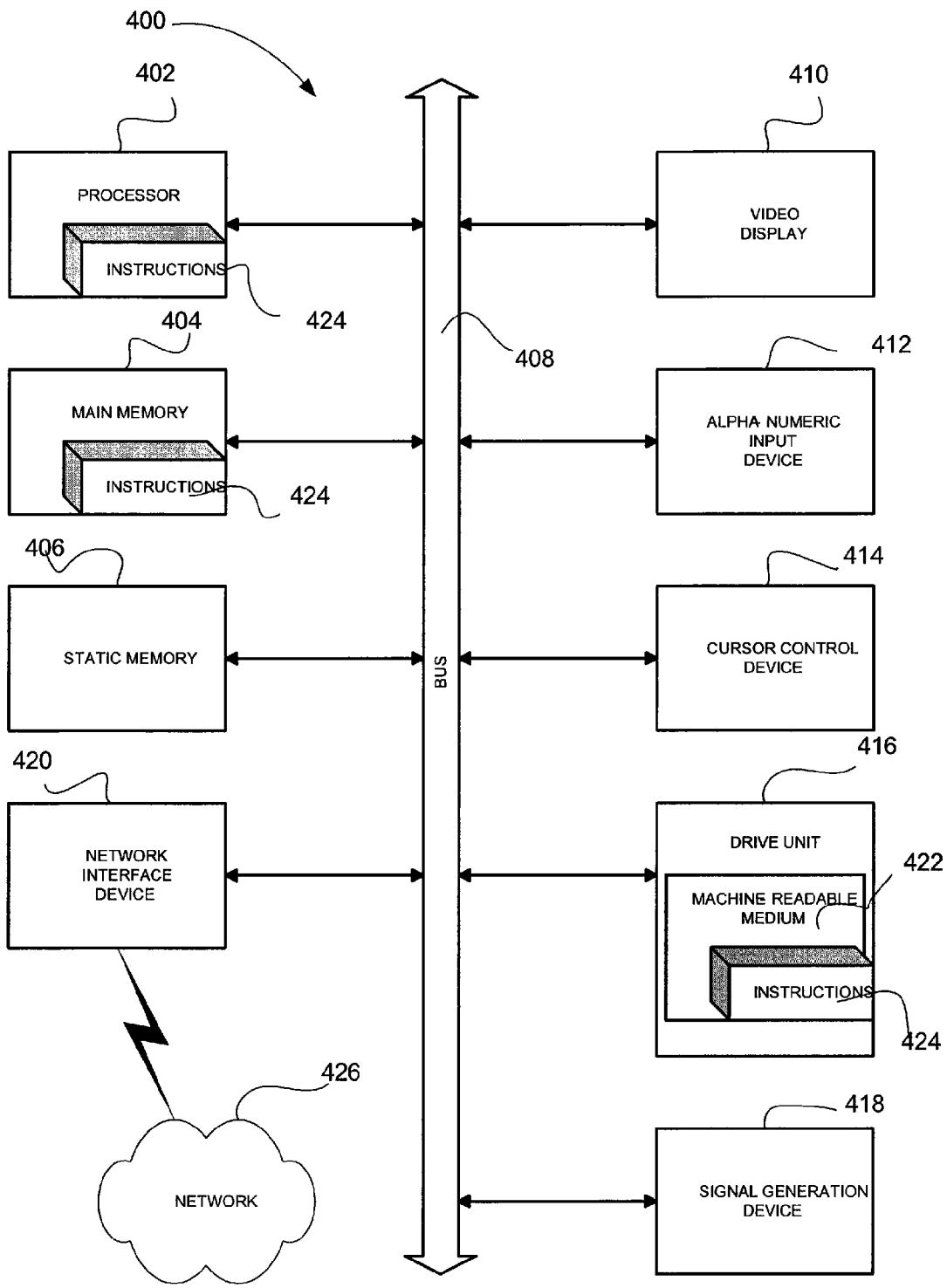
FIG. 9 shows a diagrammatic representation of machine in the example form of a computer system within which a set of instructions, for causing the machine to perform any one or more of the methodologies discussed herein, may be executed.

FIG. 9 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should betaken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium"

shall accordingly be taken to include, but not be limited to, solid-state memories, optical and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for entering data in an application, the method comprising:
    displaying a graphical user interface (GUI) keyboard, the keyboard comprising multiple identifier keys, wherein the multiple identifier keys are mapped to randomly generated code representing the multiple identifier keys, wherein each identifier key of the multiple identifier keys is mapped to different randomly generated code generated each time the GUI keyboard is displayed;
    monitoring the position of a pointer of a pointing device in relation to the multiple identifier keys;
    detecting that the pointer of the pointing device has been positioned over one of the multiple identifier keys;
    detecting selection of the identifier key based on the position of the pointer, the selection of the identifier being independent of a clicking action associated with the pointing device and wherein detecting selection of the identifier key comprises detecting when the pointer has been positioned for a predetermined period of time over the identifier key;
    in response to detecting the selection, generating data associated with the selected identifier key; and
    displaying indication data representative of the generated data in a data field, wherein the indication data is the generated data or masked data, the masked data being one of an asterisk, a hash, an ampersand symbol, or a randomly generated sequence.

2. The method of claim 1, in which the operation of monitoring the position of the pointer of the pointing device and the operation of detecting that the pointer of the pointing device has been positioned over one of the multiple identifier keys for a predetermined period of time are performed by the application.

3. The method of claim 1, comprising:
    monitoring the position of the pointer of the pointing device in relation to a data field selector in a GUI of the application; and
    detecting that the pointer of the pointing device has been positioned over the data field selector for a predetermined period of time, thereby detecting a request to display a GUI keyboard associated with the data field selector.

4. The method of claim 3, in which the data field selector is a keyboard identifier associated with a data field in the application's GUI or a data field in the application's GUI.

5. The method of claim 4, in which at least one of the multiple identifier keys comprises an action key, the method comprising:
    detecting that the pointer of the pointing device has been positioned over the action key for a predetermined period of time, thereby detecting the selection of the action key; and
    taking an action associated with the selected action key.

6. The method of claim 5, in which the action key selected is an unmask identifier key and the action taken comprises:
    detecting that the indication data is masked data and, in response to this detection, displaying the indication data as generated data in a data field; or
    detecting that the indication data is generated data and, in response to this detection, displaying the indication data as masked data.

7. The method of claim 6, in which the data field is a data field of the application's GUI.

8. The method of claim 6, in which the data field is a data field of the GUI keyboard.

9. The method of claim 5, in which the action key is a finalization identifier key and the action taken comprises removing the display of the GUI keyboard from the application's GUI.

10. The method of claim 5, in which the action further comprises displaying data representative of the generated data in the application's data field.

11. The method of claim 5, in which the action key is a correction key and the action taken comprises:
    deleting indication data displayed in the data field.

12. The method of claim 1, displaying a graphical user interface (GUI) keyboard within the application comprises randomly generating the mapping and random code each time the GUI keyboard is displayed.

13. The method of claim 1, further comprising simulating false pointer movements.

14. A non-transitory machine-readable medium embodying instructions which, when executed by a machine, cause the machine to:
    display a graphical user interface (GUI) keyboard, the keyboard comprising multiple identifier keys, wherein the multiple identifier keys are mapped to randomly generated code representing the multiple identifier keys, wherein each identifier key of the multiple identifier keys is mapped to different randomly generated code generated each time the GUI keyboard is displayed;
    monitor the position of a pointer of a pointing device in relation to the multiple identifier keys;
    select one of the multiple identifier keys in response to the pointer being positioned over the multiple identifier key for a predetermined amount of time, the selection of the identifier being independent of a clicking action associated with the pointing device;
    in response to the selection, generate data associated with the selected identifier key; and
    display indication data representative of the generated data in a data field, wherein the indication data is the generated data or masked data, the masked data being one of an asterisk, a hash, an ampersand symbol, or a randomly generated sequence.

15. A device to enter data in an application, the device comprising:
    a processor;
    a keyboard display module in communication with the processor to:
        display a graphical user interface (GUI) keyboard, the keyboard comprising multiple identifier keys;
        generate data associated with a selected identifier key;
        map the multiple identifier keys to a random code representing the multiple identifier keys, wherein each identifier key of the multiple identifier keys is mapped to different randomly generated code generated each time the GUI keyboard is displayed; and
        display indication data representative of the generated data in a data field, wherein the indication data is the generated data or masked data, the masked data being one of an asterisk, a hash, an ampersand symbol, or a randomly generated sequence;

a detection module in communication with the processor to:
  monitor the position of a pointer of a pointing device in relation to the multiple identifier keys;
  detect that the pointer of the pointing device has been positioned over one of the multiple identifier keys; and
  detect selection of the identifier key based on the position of the pointer, the selection of the identifier being independent of a clicking action associated with the pointing device; and a timer in communication with the processor to provide the detection module with a predetermined period of time for which the pointer is positioned over the identified key to indicate the selection of the identifier key.

16. The device of claim 15, in which the keyboard display module and detection module operate within the application.

17. The device of claim 15, in which the detection module is to monitor the position of the pointer of the pointing device in relation to a data field selector in a GUI of the application; and is to detect that the pointer of the pointing device has been positioned over the data field selector for a predetermined period of time, thereby detecting a request for the display of a GUI keyboard associated with the data field selector.

18. The device of claim 17, in which the data field selector is a keyboard identifier associated with a data field in the application's GUI, or a data field in the application's GUI.

19. The device of claim 15, in which at least one of the multiple identifier keys comprises an action key.

20. The device of claim 19, in which the detection module is to monitor the position of the pointer of the pointing device in relation to an identified action key, and wherein an action associated with the identified action key is performed in response to the pointer being positioned over the identified action key.

21. The device of claim 20, in which the detection module is to detect that the pointer of the pointing device has been positioned over an unmask identifier key for a predetermined period of time and is further to detect that indication data is masked data and in response thereto, instruct the keyboard display module to display the indication data as generated data in the data field.

22. The device of claim 20, in which the detection module is to detect that the pointer of the pointing device has been positioned over the unmask identifier key for a predetermined period of time and is further to detect that indication data is generated data and in response thereto, instruct the keyboard display module to display the indication data as masked data in the data field.

23. The device of claim 20, in which one of the identifier keys is a finalization identifier key, and wherein the detection module is to detect that the pointer of the pointing device has been positioned over the finalization identifier key for a predetermined period of time, is to remove the display of the GUI keyboard from the application's GUI, and is to display data representative of the generated data in the GUI's data field.

24. The device of claim 15, comprising a keyboard creation module to create a GUI keyboard, the GUI keyboards being configured according to a data entry data field associated with the GUI keyboard.

25. The device of claim 24, wherein the keyboard creation module is to create small variations in the keyboard layout of the GUI keyboard each time the keyboard layout is generated, wherein the small variations include changing between a consecutive alphabet to a QWERTY alphabet.

* * * * *